United States Patent [19]

Rahe

[11] 4,271,595
[45] Jun. 9, 1981

[54] HOUSING AND CUTTING LINE ASSEMBLY FOR VEGETATION CUTTING APPARATUS

[75] Inventor: Jon A. Rahe, Mission Viejo, Calif.

[73] Assignee: Hawaiian Motor Company, Torrance, Calif.

[21] Appl. No.: 60,938

[22] Filed: Jul. 26, 1979

[51] Int. Cl.³ .............................................. A01D 50/00
[52] U.S. Cl. ........................................ 30/347; 56/12.7
[58] Field of Search .................. 30/276, 347; 56/12.7, 56/295

[56] References Cited

U.S. PATENT DOCUMENTS

| 4,138,810 | 2/1979 | Pittinger | 30/276 |
| 4,148,141 | 4/1979 | Hoff | 30/276 |
| 4,190,954 | 3/1980 | Walto | 30/347 |

Primary Examiner—Jimmy C. Peters
Attorney, Agent, or Firm—Nilsson, Robbins, Dalgarn, Berliner, Carson & Wurst

[57] ABSTRACT

A housing and cutting line assembly for a vegetation cutting apparatus of the type which cuts with rapidly moving lines extending from a rotating housing includes metallic line guides taking a configuration which addresses the effective guiding of the extending of the lines exteriorly of the housing and the dissipation of heat from the lines. The line guides each have a trailing side wall bearing surface for the associated line, which includes two linear surface portions angularly disposed with respect to one another, and a leading side wall bearing surface which includes a linear surface portion and a curvilinear surface portion. The linear leading side wall surface portion is substantially uniformly spaced from an inner, linear trailing side wall bearing surface portion, and the curvilinear surface portion of the leading side wall bearing surface curves away from this inner surface portion. In addition, the lines guides each in part define an air channel for moving air on the leading side of the associated line relative to the line guide to cool the line, and each further define an air cavity therein, located to trail the associated line, for conducting heat generated in the line away from the line.

16 Claims, 4 Drawing Figures

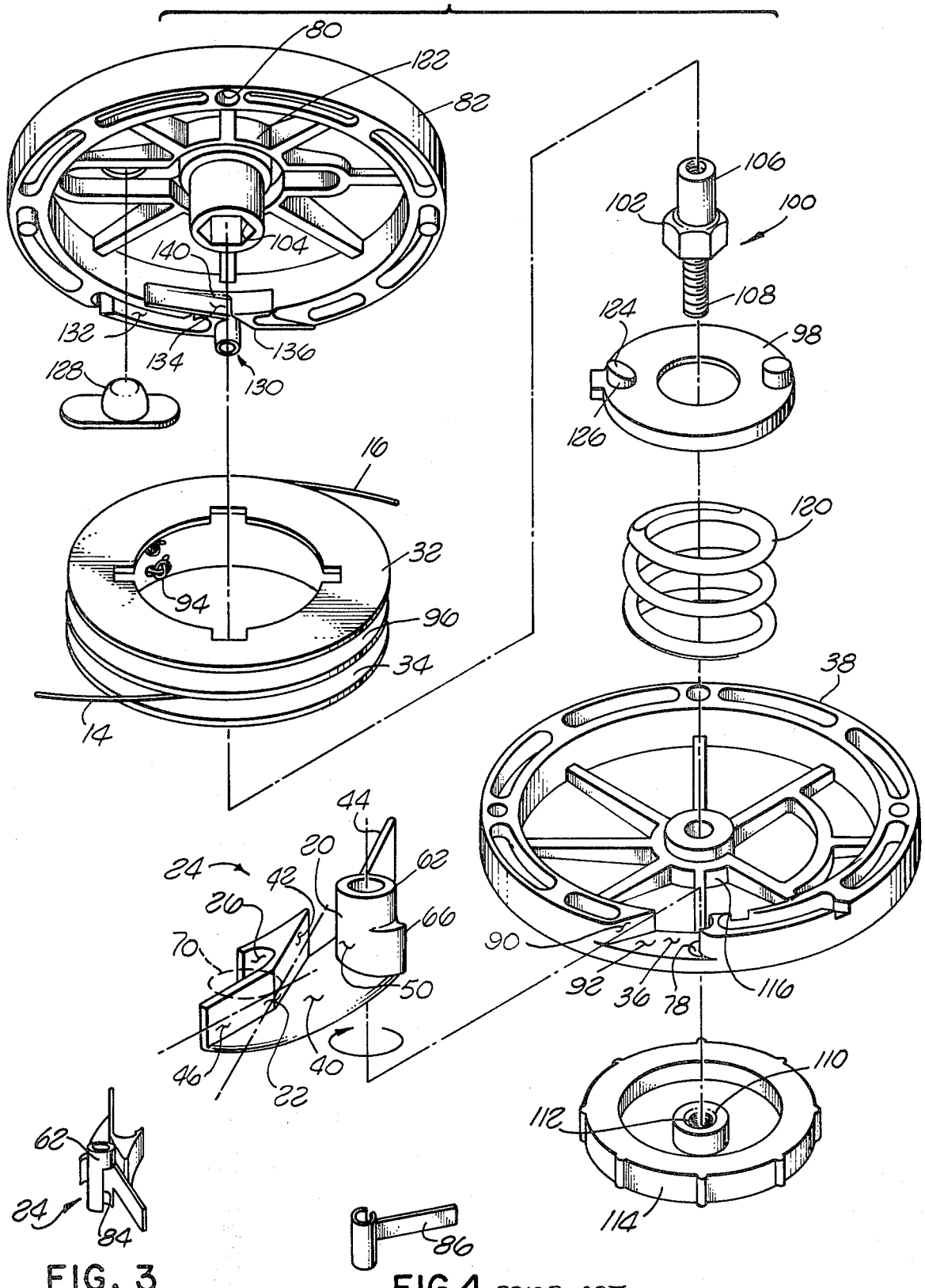

HOUSING AND CUTTING LINE ASSEMBLY FOR VEGETATION CUTTING APPARATUS

BACKGROUND OF THE INVENTION

This invention relates to vegetation cutting apparatus, more particularly to the type of vegetation cutting apparatus which cuts by using one or more rapidly moving lines extending from a rotating housing.

The advantages, including safety and flexibility, offered by this type of vegatation cutting apparatus over the type of apparatus using blades or comparable cutting mechanisms, is well appreciated. Thus, improving and overcoming problems in this former type of apparatus are goals which have received a great deal of attention. Two areas of significant concern have been the development of the line that is required and the development of mechanisms for storing and dispensing additional line as the line breaks or wears out due to its cutting action or due to the heat and fatigue which develop as a result of the interactions between the line and other parts of the apparatus.

However, and perhaps somewhat surprisingly, the area which has most stubbornly resisted satisfying solutions is the design of structure through which the line can exit a housing rotating at, e.g. between approximately 5000-7000 rpms, while avoiding excessive heating and breakage.

The history of this concern and of the continuing attempts to satisfy it over the years is well documented in the literature and in the marketplace. Thus, early approaches to trimmer apparatus, as in U.S. Pat. Nos. 3,708,967, 3,826,068, and 3,859,776, focus on curvilinear cutting head surfaces with the lines loosely disposed therebetween, elastomeric line retainers to hold the line against a surface, or pins which the lines may contact.

Subsequent approaches incorporated in trimmer apparatus include interconnected or distinct metal inserts to curve along at least part of a curvilinear wall of the cutting head, as in U.S. Pat. Nos. 4,052,789, 4,124,938, and 4,114,269, along with a spool extension extending into the exit port, as in U.S. Pat. No. 4,052,789. Alternative subsequent approaches incorporate arcuate structures extending into exit channels from both sides to hold the lines, elastomeric retainers to hold the lines against arcuate structures having metal inserts therein, and the more traditional curvilinear surfaces with the lines therebetween, one of such surfaces being provided with a metal insert, as in U.S. Pat. Nos. 4,035,912, 4,067,108 and 4,104,797. Also application Ser. No. 742,963, with Virgil H. Stair and Dale D. Evenson as inventors, discloses support structure for the lines exterior to a spool cavity, which, as indicated therein, may have metallic surfaces for conductivity purposes.

Apparatus more closely resembling traditional lawn mowers, but employing rapidly moving cutting lines, evidences somewhat similar problems and concerns. Thus, U.S. Pat. No. 4,054,992 discloses rather tightly-fitting exit channels through a disc-like member, into which the lines are press-fit; U.S. Pat. No. 4,112,653 discloses, in most relevant part, structures creating tightly-fitting passageways about the lines and also creating curvilinear wall surfaces; and U.S. Pat. No. 4,107,901 discloses line-supporting tubes near the periphery of lawn mower-type structure. U.S. Pat. No. 4,136,446 is also of some interest.

The most trying condition for the exit structure is where the rotation is rapid, e.g. of the order of 6500-7000 rpms. Such rapid rotation is often associated with heavy cutting needs and with the use of larger size lines to withstand the larger forces associated with such cutting needs. Thus, certain designs have proven satisfactory for lighter tasks, but have failed in the heavier, more difficult situations. A typical example of this, which is presented in somewhat more detail below, is shown in FIG. 4.

The developments evidenced by the foregoing patents, and an appreciation of the effects of the high speeds involved in apparatus of the type of concern herein, ultimately makes quite understandable the difficulties encountered in designing a satisfactory exit structure and the criticality of refinements to the attainment thereof.

SUMMARY OF THE INVENTION

The present invention addresses the indicated exit structure problem in ways which significantly depart from prior attempts, as evidenced by the above discussion, and in fact, in a number of critical respects, in ways which contradict the teachings of such attempts.

In accordance with the invention, a housing and cutting line assembly for a vegetation cutting apparatus includes: a housing rotatable about an axis; at least one line mounted within the housing to extend exteriorly of the housing and contact and cut vegetation by rapid circular movement exteriorly of the housing during rotation of the housing; and a metallic line guide attached to the housing for guiding the extending of the line exteriorly of the housing during such rotation by contact with the line and for conducting heat generated in the line away from the line; wherein the line guide has a leading side wall bearing surface for the line during such rotation, and a corresponding trailing side wall bearing surface for the line which has first and second linear surface portions angularly disposed with respect to one another. The line guide may further have a floor surface for underlying the line during such rotation, or a ceiling surface for overlying the line during such rotation; also, the first and second linear surface portions of the trailing surface may intersect each other and both be tangent to an imaginary circle having a radius of approximately 3.18 mm (0.125"). In connection with the mounting of the line, a spool may be mounted in the housing and the line may be wound around the spool and extend therefrom during such rotation.

In accordance with other aspects of the invention, a housing and cutting line assembly for a vegetation cutting apparatus includes: a housing as initially described above; at least one line as initially described above; and a metallic line guide attached to the housing for guiding the extending of the line exteriorly of the housing during the rotation of the housing by contact with the line; wherein the line guide at least in part defines an air channel for moving air on the leading side of the line relative to the line guide to cool the line during such rotation, and the line guide further has an air cavity therein, located to trail the line during such rotation, for conducting heat generated in the line away from the line. Additional features may incorporate the disposition of the line guide about the line, on three sides only with the presentation by the line guide of a leading side wall bearing surface for the line, a trailing side wall bearing surface for the line, and a floor surface for underlying the line or a ceiling surface for overlying the line.

In accordance with yet other aspects of the invention, a housing and cutting line assembly for a vegetation cutting apparatus includes: a housing as initially described above; at least one line as initially described above; and a metallic line guide attached to the housing for guiding the extending of the line exteriorly of the housing during the rotation of the housing, the line guide having a leading and a trailing side wall bearing surface for the line during such rotation; wherein the trailing side wall bearing surface has a linear surface portion, and the leading side wall bearing surface has a linear surface portion substantially uniformly spaced from the trailing side wall linear surface portion along part of the trailing side wall linear surface portion, and further has a curvilinear surface portion curving away from the trailing side wall linear surface portion along part of the trailing side wall linear surface portion. More detailed features incorporate a ratio of such substantially uniform spacing to the diameter of the line in the range of approximately 1.1 to 1.5.

BRIEF DESCRIPTION OF THE DRAWINGS

FIG. 2 is an exploded perspective view of the apparatus of FIG. 1 (partially enlarged for clarity).

FIG. 3 is a perspective view of a part of the apparatus of FIGS. 1 and 2.

FIG. 4 is a perspective view of a prior art element which preceded the incorporation of the part of FIG. 3 in the apparatus of FIGS. 1 and 2.

DETAILED DESCRIPTION

Figure 1:
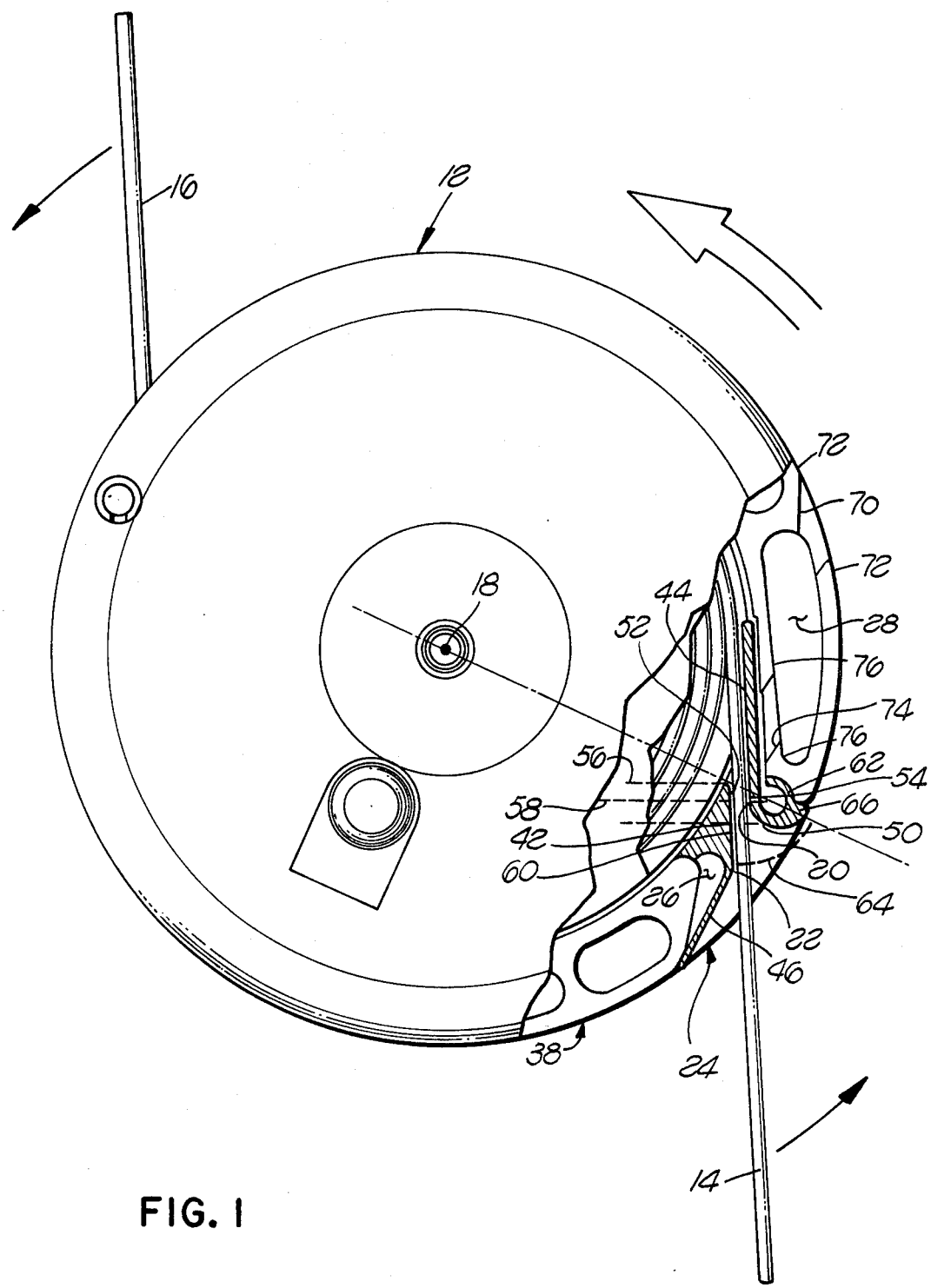
FIG. 1 is a plan view, partially broken away and in section, of an assembly in accordance with the invention.

Referring initially to FIG. 1, a rotating housing 12 for a vegetation cutting apparatus has a first line 14 and a second line 16 mounted therein and extending therefrom as the housing rotates. The housing is rotating about an axis, represented by a dot 18, and portions of the lines extending exteriorly of the housing move in a rapid, generally circular pattern to contact and cut vegatation. As is readily evident, such movement of each line substantially defines a cutting plane for the respective line.

Focusing on the first line 14, as the housing rotates and the line moves and cuts, the line bears against and moves between a leading (with reference to the direction of rotation) side wall bearing surface 20 and a trailing side wall bearing surface 22 of a first metallic line guide 24 (see also FIG. 2). During such rotation, while heat is being generated in the line 14 and along the leading and trailing side wall surfaces, an air cavity 26 in and defined by the line guide 24 facilitates the conduction of heat generated in the line and along the trailing side wall bearing surface away from the line. In addition, a first air channel 28, in part defined by the housing 12 and in part defined by the first line guide, permits a cooling stream of air on the leading side of the line to move relative to the line guide and facilitate the conduction of heat generated in the line away from the line and away from the leading side wall bearing surface.

Still focusing on the first line 14, and on structural and operational aspects associated therewith in detail, the first line 14 is wound around a spool 32 in a lower cavity 34 of the spool and, during rotation and cutting, extends from the spool through a line port 36 through a lower cover 38 of the housing 12, between the leading and trailing side wall bearing surfaces 20 and 22, and above a floor surface 40, of the first line guide 24. (See FIGS. 1 and 2.) Due to the centrifugal force on the line as it rapidly moves in its circular pattern, the line will tend to contact and push against the leading side wall bearing surface 20. However, due to the relative close proximity of an inner linear surface portion 42 of the trailing side wall bearing surface, to a linear surface portion 44 of the leading side wall bearing surface, the line is expected to regularly also push and bear against the trailing side wall surface, even when the line is not whipping backwards as a result of, e.g., encountering heavy vegetation or articles which it cannot cut. During the just-mentioned whipping backwards, which essentially is a normal and expected occurrence, the line 14 will generally move toward an outer linear surface portion 46 of the trailing side wall bearing surface 22, which intersects the inner linear surface portion 42 of the trailing side wall bearing surface and which is angularly disposed with respect thereto. Due to the return of the line from such whipping backwards and as a result of other essentially normal and expected occurrences, the line will also commonly whip forwardly during rotation. A curvilinear surface portion 50 of the leading side wall bearing surface 20 will normally be contacted by the line during such occurrences.

The configuration of these surface portions and their relationships to each other and to the line is of great significance in overcoming problems of line melt, particularly as housing speeds approach the 5000–7000 rpm range, often in association with relatively large diameter lines employed for heavy cutting. Thus, it is noted that an initial part 52 of the inner linear surface portion 42 of the trailing side wall bearing surface 20 is substantially uniformly spaced therealong from an opposed part 54 of the linear surface portion 44 of the leading side wall bearing surface 20. These parts are defined between initial and intermediate dashed lines 56 and 58 shown in FIG. 1. It is also noted that the curvilinear surface portion 50 of the leading side wall bearing surface curves away from an intermediate part 60 of the inner linear surface portion of the trailing side wall bearing surface, along that part. A design which calls for a spacing of approximately 3.05 mm (0.120″) for the foregoing substantially uniform spacing has been found to perform satisfactorily for a (circular) line having a diameter as small as 2.03 mm (0.080″), and as large as 2.67 mm (0.105″), with the larger diameters generally preferable for speeds approaching 5000–7000 rpms and heavy cutting. A line with a diameter between the foregoing, e.g., 2.41 mm (0.095″), may also then be satisfactorily used in many applications. Due to formation requirements in die-casting the line guide 24, particularly in light of the thin wall structure at various points, a relatively insubstantial increase in the indicated spacing toward the top of the line guide (due to a "draft"), for example of the order of 10%, typically exists. Employing the indicated design spacing with the indicated range of diameters, a ratio of such spacing to the diameter of the line, in the range of 1.1 to 1.5, may be derived.

Other aspects of the design of course also contribute to the satisfactory result. Thus, an angle between a line from the axis 18 through the center of a curled part 62 of the line guide, and the inner linear surface portion 42 of the trailing side wall bearing surface 22, of approximately 56°, is deemed to be of significance in achieving satisfactory performance. This angle is represented by a dashed arc 64 in FIG. 1

Further, by reference to FIGS. 1 and 2, it is apparent that the part of the curvilinear surface portion 50 of the leading side wall bearing surface 20 which is formed by a fin structure 66 extending from the curled part 62 of the line guide, includes parts having two different radii of curvature. Their relationship is conveniently measured according to standard techniques by the radius of a horizontal imaginary circle (not shown) which is tangent to both parts. The particular design herein calls for such a radius of approximately 3.18 mm (0.125"). Employing a similar technique for defining the relationship between the inner linear surface portion 42 and outer linear surface portion 46 of the trailing side wall bearing surface 22, such a circle 70 is represented by dashes in FIG. 2, and also has a radius of approximately 3.18 mm (0.125").

The metallic nature of the line guide 24 is of importance in minimizing the friction between the line 14 and the line guide, and the metallic material of the guide surrounds the line on three sides. The strength of the line guide is also of importance due to the excessive conditions it must withstand. However, due to the high speeds involved, and the associated, large centrifugal forces, the line guide should also preferably be made relatively light. The properties of aluminum are considered favorable in satisfying the requirements of the line guide; and aluminum alloys are the preferred materials. In particular, an aluminum alloy designated by the American Society of Testing Materials No. SC84B has proven satisfactory, although other readily apparent alternatives could also be employed. Similarly, formulations of nylon are the preferred materials for the line and housing (monofilament in the case of the line) though other materials, well known in the art, could also be employed. As previously implied, die-casting is the preferred technique of formation for the line guide.

The thermal conductivity of the line guide (and the aluminum therein) is of particular significance in the removal of heat generated in the line and along the side wall bearing surfaces. The air cavity 26 in the line guide, on the trailing side of the line 14, and the air channel 28, in part defined by the line guide, are also of significance in the removal of such heat. The air cavity is preferably made as large as possible in accordance with formation and strength requirements and limitations.

With regard to the air channel 28, an entrance port 70 for the air and of the channel is provided through an outer side wall 72 of the lower cover 38 forming the lower part of the housing; an intermediate port 74 is provided through an inner side wall 76 of the lower cover; and exit ports 78 and 80 for the air and of the channel are provided through the lower cover and an upper cover 82 forming the upper part of the housing 12, respectively. (See FIGS. 1 and 2.) The curled part 62 of the line guide 24 is press-fit into and extends partially through the exit port 78 in the lower cover (see FIGS. 2 and 3) and, with other parts of the trailing structure of the guide, also in part defines the channel 28. This curled part also extends partially through the exit port 80 in the upper cover 82. By reference to FIG. 3, it may also clearly be seen that this curled part 62 has a circumferential gap 84 therethrough for the passage of the cooling stream of air to the inside of the curled part.

Before proceeding to address in more detail the way in which the first and second lines 14 and 16 are mounted in the housing 12 and the way in which the assembly of FIGS. 1 and 2 fits together, it is of interest to note that a prior art insert 86 (formed with brass as its prime constituent) has proved unsuccessful in satisfying the extreme speed, line and heavy cutting requirements of the line guides herein. Such a prior art insert, is conventionally employed in an assembly such as that of FIGS. 1 and 2 and, with respect to the first line 14, is conventionally mounted in the exit port 78 through the lower cover of the first channel 28. As may be appreciated, it thus has an effect only on the leading side of the line and cooperates (with reference to the lower cover 38) with a trailing surface 90 and a bottom surface 92 defined by the cover itself (FIG. 2).

Proceeding to a consideration of the manner in which the first and second lines 14 and 16 are mounted in the housing 12 and the way in which the assembly of FIGS. 1 and 2 fits together, this is readily understood by reference to FIG. 2.

As previously indicated, the first line 14 (which exits the housing 12 through the lower cover line port 36) is wound around the spool 32 in the lower cavity 34 of the spool (e.g., formed from a nylon formulation). A retaining hole 94 is provided for retaining the first line 14 (e.g., through a knot in the line or purely by friction without a knot). The second line 16 is similarly wound about the spool in an upper cavity 96 defined by the spool and threaded through a similar retaining hole (not shown). A lock ring 98 (e.g., formed from a nylon formulation) is provided for the spool; and an arbor post 100 (e.g., formed from steel), having an hexagonal intermediate portion 102 which mates with an hexagonal portion 104 of a hole through the center of the upper cover 82, and which passes through the lock ring 98 and lower cover 38, acts as a rotating axle for the assembly. The arbor post has an internally threaded upper end 106 for operative connection with, e.g., a rotating shaft (not shown) for driving the housing, and an externally threaded lower end 108 which is engaged by an internally threaded insert 110 in a cavity 112 formed in a glide ball element 114. The glide ball element 114, aside from its function in holding the assembly together, provides a convenient underside for contact, accidental or otherwise, with the ground or other surfaces.

A rib network 116 formed along the inside of the lower cover 38 acts as a lower support for a coil spring 120 (e.g., formed from steel) which pushes the lock ring 98 against a rib network 122 formed along the inside of the upper cover 82. This results in the positioning of a contact surface 124 of a protrusion 126 formed along the lock ring, in close proximity to the underside of a release button 128. A pushing of this button, when operation has been ceased, will disengage the spool 32 from the lock ring 98 so that the spool may be rotated relative to the housing to extend additional lengths of line from the spool. The paying out of additional lengths of line is thus accomplished manually. However, mechanisms for unlocking the spool to permit relative rotation between the spool and housing during normal rotation are well-known by those skilled in the art, and in the marketplace, and are readily employed with an assembly along the lines of that of FIG. 2, including the line guides herein. For example, cutting apparatus marketed under the trademark "The Green Machine", incorporates such mechanisms. Such mechanisms are, however, of no direct concern herein.

By reference to FIG. 2, it is evident that a second line guide 130 performs analogous guiding, heat conducting and channel-forming functions with respect to the second line 16 and a second air channel 132 as the first line guide 24 does, with respect to the first line 14. Thus, the second line guide has a leading side wall bearing surface 134 and a trailing side wall bearing surface 136 which may be analogized to such surfaces of the first line guide 24. Of course, and as shown in FIG. 2, the roles of the upper and lower cover are essentially reversed in the case of the second line and line guide. Thus, the contribution to the formation of the second air channel is by the upper cover 82 rather than by the lower cover 38. Further, with respect to the line guides, it is noteworthy that the second, upper line guide, has a ceiling surface 140 with respect to the second line 16 rather than the floor surface of the first line guide. Concerning these floor and ceiling surfaces, it should however be noted that during operation, the housing will often be tilted, and along with this tilting, ceiling and floor surfaces, as well as the side wall surfaces, will also often be tilted.

There are, of course, many readily apparent variations which may be made in the embodiment described herein. By way of example, a housing may be formed of a single element, for example, an "upper" cover only with wider side walls; a spool with a single cavity and two interleaved lines could readily be employed; and the air channels and air cavities herein could be varied in numerous respects.

It will be further appreciated that many other changes and variations in the described embodiment may be made without departing from the spirit and scope of the invention.

What is claimed is:

1. A housing and cutting line assembly for a vegetation cutting apparatus, comprising:
    a housing rotatable about an axis;
    at least one line mounted within said housing to extend exteriorly of said housing and contact and cut vegetation by rapid circular movement exteriorly of said housing during rotation of said housing; and
    a metallic line guide attached to said housing for guiding the extending of said line exteriorly of said housing during said rotation by contact with said line and for conducting heat generated in said line away from said line, said line guide having,
    a leading side wall bearing surface for a portion of said line during said rotation, and
    a trailing side wall bearing surface for said portion of said line during said rotation, said trailing side wall bearing surface having first and second linear surface portions angularly disposed with respect to one another.

2. A housing and cutting line assembly as defined in claim 1 wherein said line guide further has a floor surface for underlying said line during said rotation.

3. A housing and cutting line assembly as defined in claim 1 wherein said line guide further has a ceiling surface for overlying said line during said rotation.

4. A housing and cutting line assembly as defined in claim 1 wherein said line guide has an air cavity, located therein to trail said trailing surface during said rotation, for conducting heat generated in said line and along said trailing surface away from said line and said trailing surface.

5. A housing and cutting line assembly as defined in claim 1 wherein said first and second linear portions of said trailing surface intersect each other and are substantially tangent to an imaginary circle having a radius of approximately 3.18 mm.

6. A housing and cutting line assembly as defined in claim 1 wherein said leading side wall bearing surface has a linear surface portion and a curvilinear surface portion.

7. A housing and cutting line assembly as defined in claim 1 further comprising a spool mounted in said housing for winding said line therearound, and for extending said line therefrom during said rotation of said housing.

8. A housing and cutting line assembly as defined in claim 1 wherein said line guide has surfaces for disposition about said line on three sides only during said rotation, said surfaces including:
    said leading side wall bearing surface for said line during said rotation;
    said trailing side wall bearing surface for said line during said rotation; and
    a floor surface for underlying said line during said rotation.

9. A housing and cutting line assembly as defined in claim 1 wherein said line guide has surfaces for disposition about said line on three sides only during said rotation, said surfaces including:
    said leading side wall bearing surface for said line during said rotation;
    said trailing side wall bearing surface for said line during said rotation; and
    a ceiling surface for overlying said line during said rotation.

10. A housing and cutting line assembly for a vegetation cutting apparatus as defined in claim 1 wherein said first and second linear surface portions of said trailing side wall bearing surface intersect each other.

11. A housing and cutting line assembly for a vegetation cutting apparatus as defined in claim 10 wherein:
    said circular movement of said line exteriorly of said housing substantially defines a cutting plane for said line;
    said leading side wall bearing surface passes through said cutting plane during said rotation of said housing; and
    said trailing side wall bearing surface passes through said cutting plane during said rotation of said housing.

12. A housing and cutting line assembly for a vegetation cutting apparatus, comprising:
    a housing rotatable about an axis;
    at least one line mounted within said housing to extend exteriorly of said housing and contact and cut vegetation by rapid circular movement exteriorly of said housing during rotation of said housing; and
    a metallic line guide attached to said housing for guiding the extending of said line exteriorly of said housing during said rotation, said line guide having a leading side wall bearing surface for a portion of said line and a trailing side wall bearing surface for said portion of said line during said rotation;
    said trailing side wall bearing surface having a linear surface portion, and said leading side wall bearing surface having a linear surface portion substantially uniformly spaced from said trailing side wall linear surface portion along part of said trailing side wall linear surface portion and having a curvilinear surface portion curving away from said trailing side wall linear surface portion along part of said trailing side wall linear surface portion.

13. A housing and cutting line assembly as defined in claim 12 wherein the ratio of said substantially uniform spacing between said linear surface portions to the diameter of said line is in the range of approximately 1.1 to 1.5.

14. A housing and cutting line assembly as defined in claim 13 further comprising a spool mounted in said housing for winding said line therearound, and for extending said line therefrom during said rotation of said housing.

15. A housing and cutting line assembly for a vegetation cutting apparatus as defined in claim 12 wherein said linear and said curvilinear surface portions of said leading side wall bearing surface intersect each other.

16. A housing and cutting line assembly for a vegetation cutting apparatus as defined in claim 15 wherein:
   said circular movement of said line exteriorly of said housing substantially defines a cutting plane for said line;
   said leading side wall bearing surface passes through said cutting plane during said rotation of said housing; and
   said trailing side wall bearing surface passes through said cutting plane during said rotation of said housing.

* * * * *